(12) United States Patent
Jones

(10) Patent No.: US 7,086,703 B1
(45) Date of Patent: Aug. 8, 2006

(54) CHILD AND ADULT PROTECTIVE SEAT BELT CUSHION

(76) Inventor: Anna Jones, P.O. Box 261, Staffordville, CT (US) 06077

( * ) Notice: Subject to any disclaimer, the term of this patent is extended or adjusted under 35 U.S.C. 154(b) by 63 days.

(21) Appl. No.: 10/992,969

(22) Filed: Nov. 18, 2004

(51) Int. Cl.
*B60R 21/00* (2006.01)

(52) U.S. Cl. ............... 297/488; 297/487; 297/464; 5/657; 5/652

(58) Field of Classification Search ............... 297/488, 297/487, 483, 482, 219.12; 5/657, 652
See application file for complete search history.

(56) References Cited

U.S. PATENT DOCUMENTS

| 4,595,618 A | 6/1986 | Caringer |
| 4,984,849 A | 1/1991 | Rist |
| 5,114,185 A | 5/1992 | Reedom |
| 5,275,468 A | 1/1994 | Vacanti |
| 5,996,153 A * | 12/1999 | Slater et al. ............ 5/655 |
| 6,322,149 B1 * | 11/2001 | Conforti et al. ............ 297/482 |
| 6,322,150 B1 | 11/2001 | Harper et al. |
| 6,394,554 B1 | 5/2002 | Hingle |
| 6,708,353 B1 * | 3/2004 | Han ............ 5/632 |
| 6,795,990 B1 * | 9/2004 | Hutchinson D. C. ............ 5/632 |
| 2002/0074847 A1 | 6/2002 | Terpselas |
| 2003/0052528 A1 | 3/2003 | Huggins |

* cited by examiner

*Primary Examiner*—Peter M. Cuomo
*Assistant Examiner*—Tania Abraham
(74) *Attorney, Agent, or Firm*—Harpman & Harpman

(57) ABSTRACT

A seat and shoulder belt protective cushion configuration for use in motor vehicles and the like. The cushion has pairs of elongated cushion extension arms extending from a central body member and a removable vertically disposed cushion portion that extends to provide shoulder belt displacement preventative element above the co-planar top edge surface of the respective upper cushion arm extensions for a child. The protective cushion is positioned between the occupant and a seat belt assembly securely restraining the occupant in place in the motor vehicle.

7 Claims, 3 Drawing Sheets

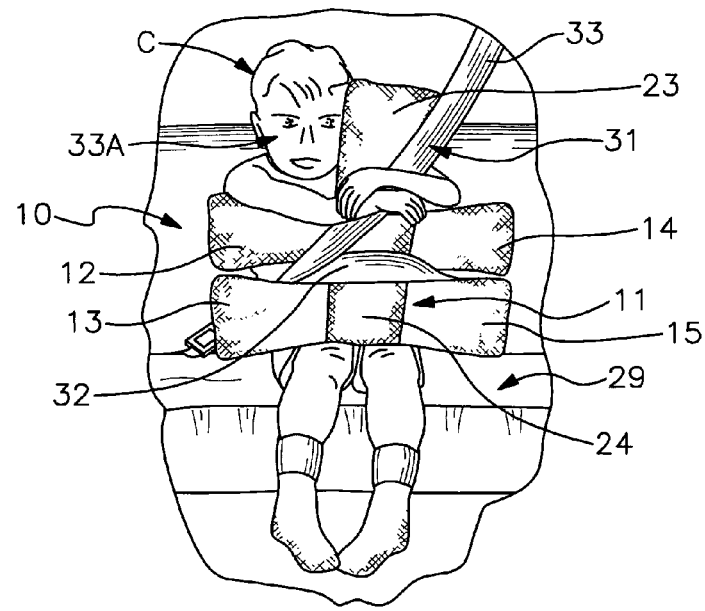
Fig. 1
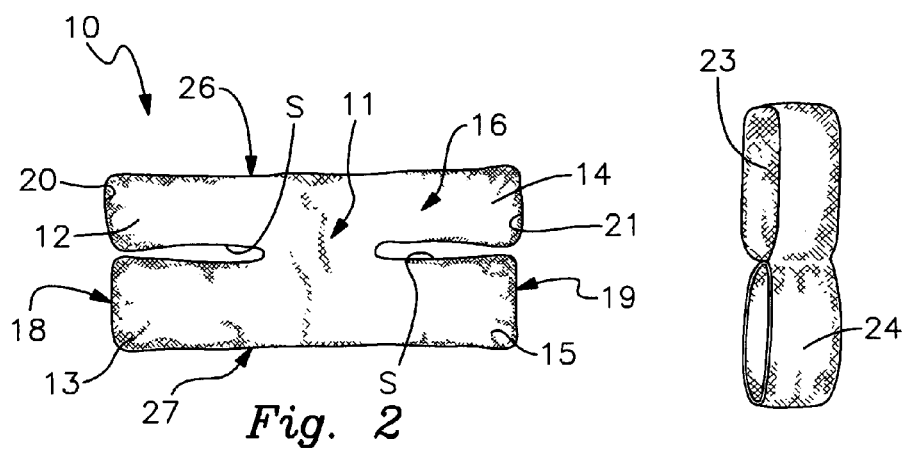
Fig. 2
Fig. 3

CHILD AND ADULT PROTECTIVE SEAT BELT CUSHION

BACKGROUND OF THE INVENTION

1. Technical Field

This invention relates to vehicle safety restraints used in transportation vehicles to engage and position seat belt shoulder belt combinations from direct contact across the occupant's waist and upper torso.

2. Description of Prior Art

Prior art devices of this type have been directed to a variety of safety belt covers and select pads, see for example U.S. Pat. Nos. 4,595,618, 4,984,849, 5,114,185, 5,275,468, 6,322,150, 6,394,554 and Patent Publications 2002/0074847A1 and 2003/0052528A1.

In U.S. Pat. No. 4,595,618 a vehicle seat belt accessory can be seen having a stuffed animal characterization such as a bear through which a seat belt is selectively positioned with the article being positioned forward of the belt which is in contact with the user.

U.S. Pat. No. 4,984,849 discloses a cover for a vehicle seat belt restraint shield for an infant car seat. The cover has a fanciful three-dimensional animal representation that fits over the typical T-shaped shield of a car seat belt and harness construction.

U.S. Pat. No. 5,114,185 illustrates a protective cushion for automotive vehicles. The so-configured cushions are removably secured to the interior vehicle surfaces such as a dashboard and can be formed as stuffed animal configurations with an alternate form for use on a seat belt.

A child restraining seat belt aid is claimed in U.S. Pat. No. 5,275,468 in which a body engagement plate having multiple belt engagement fingers is positioned on a lap and shoulder belt. The plate extends therebetween and is of an integral synthetic resin material.

U.S. Pat. No. 6,322,150 addresses safety issues for pregnant women in which an elongated belt cushion pad is removably secured along a portion of the lap belt section of a seat belt assembly in which the cushion has multiple folded layer configurations incorporated about the belt and for strategic positioning of the cushion element associated therewith.

Patent Publication 2002/0074847A1 shows a protective covering for a vehicle seat belt having a two sided triangular shape body member which are formed together around a lap and shoulder belt combination increasing the effective body contact area of the assembly, Finally, Patent Publication 2003/0052528A1 defines a detachable protective pad for the abdominal area of a human in which an oval shaped pad is selectively secured to either the front or back surface of a lap and shoulder belt combination.

SUMMARY OF THE INVENTION

A two part child and adult seat belt contoured protective cushion configuration that is held in place against the occupant by the lap and shoulder belt assembly of the vehicle for use with or without a child's car seat. The protective cushion of the invention has fixed multiple arm like extension portions and a detachable upstanding arm that allow the selective engagement of the lap and shoulder belt there across isolating the child from possible injury reducing direct contact with the belt during impact.

DESCRIPTION OF THE DRAWINGS

FIG. 1 is a front perspective view of the assembled safety cushion of the invention on a child in a motor vehicle;

FIG. 2 is a front elevational view of the base safety cushion of the invention independent of use configuration;

FIG. 3 is a perspective view of a detachable cushion arm portion of the safety cushion as seen in FIG. 1;

DETAILED DESCRIPTION OF THE INVENTION

Figure 4:
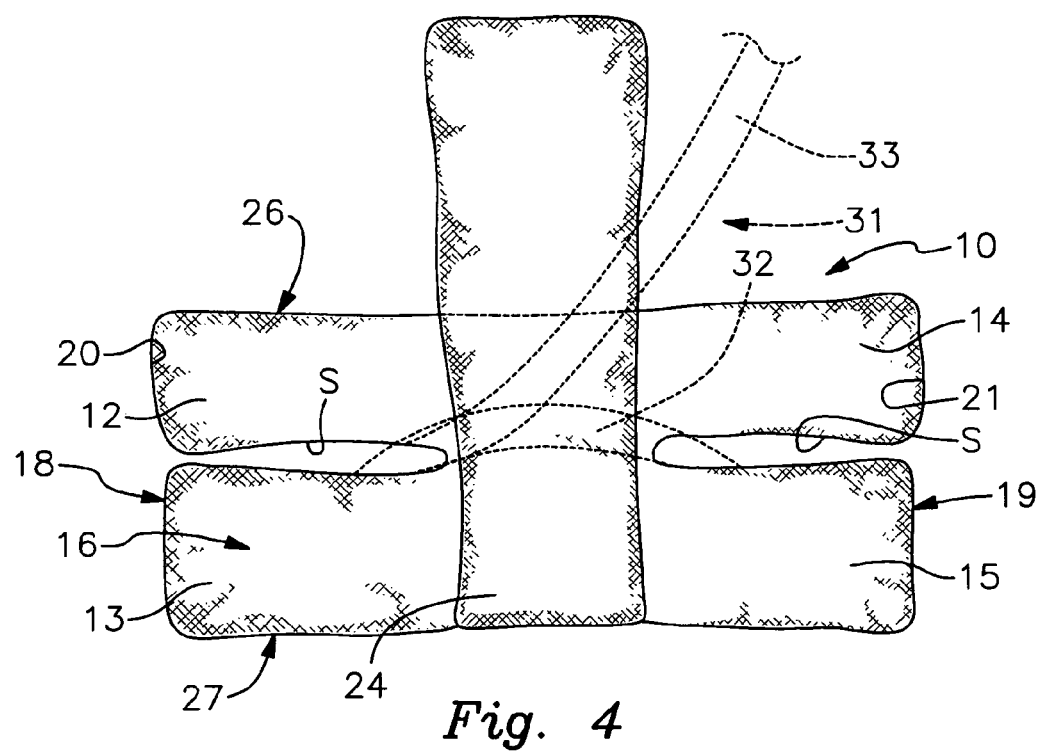
FIG. 4 is an enlarged front elevational view of the assembled safety cushion of the invention illustrating projected seat belt engagement paths in broken lines.
Figure 5:
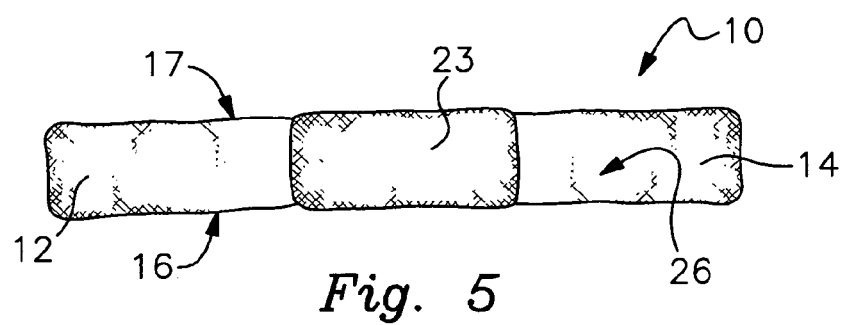
FIG. 5 is a top plan view thereof.

Referring to FIGS. 1–3 of the drawings, a safety seat belt cushion 10 can be seen having a two part configuration with central elongated contoured body member portion 11 which has a plurality of integral oppositely disposed arm extensions 12 and 13 and 14 and 15 in pairs extending therefrom. The central elongated rectangular body member portion 11 and extension arms 12–15 are preferably formed from fabric material defining a front surface 16 and a back surface 17. Sidewall panels 18 and 19 extend between and interconnect respective front and back surfaces 16 and 17 with contoured side edges 20 and 21 corresponding to arm pairs 12 and 13 and 14 and 15. An upstanding extension cushion portion 23 as best seen in FIG. 3 of the drawings has a fabric attachment loop 24 extending therefrom. The loop 24 is selectively engaged transversely about the central contoured body member portion as seen in FIGS. 1, 4 and 5 of the drawings. Top and bottom panels 26 and 27 respectively extend between and interconnect associated remaining portions of respective front and back surfaces 16 and 17 forming the integral cushion configuration of the body member 11. A resilient synthetic foam material F fills both the cushion 10's portion 11 and 23 interiors defined by the hereinbefore described interconnected fabric portions as will be well known and understood by those skilled in the art.

Figure 6:
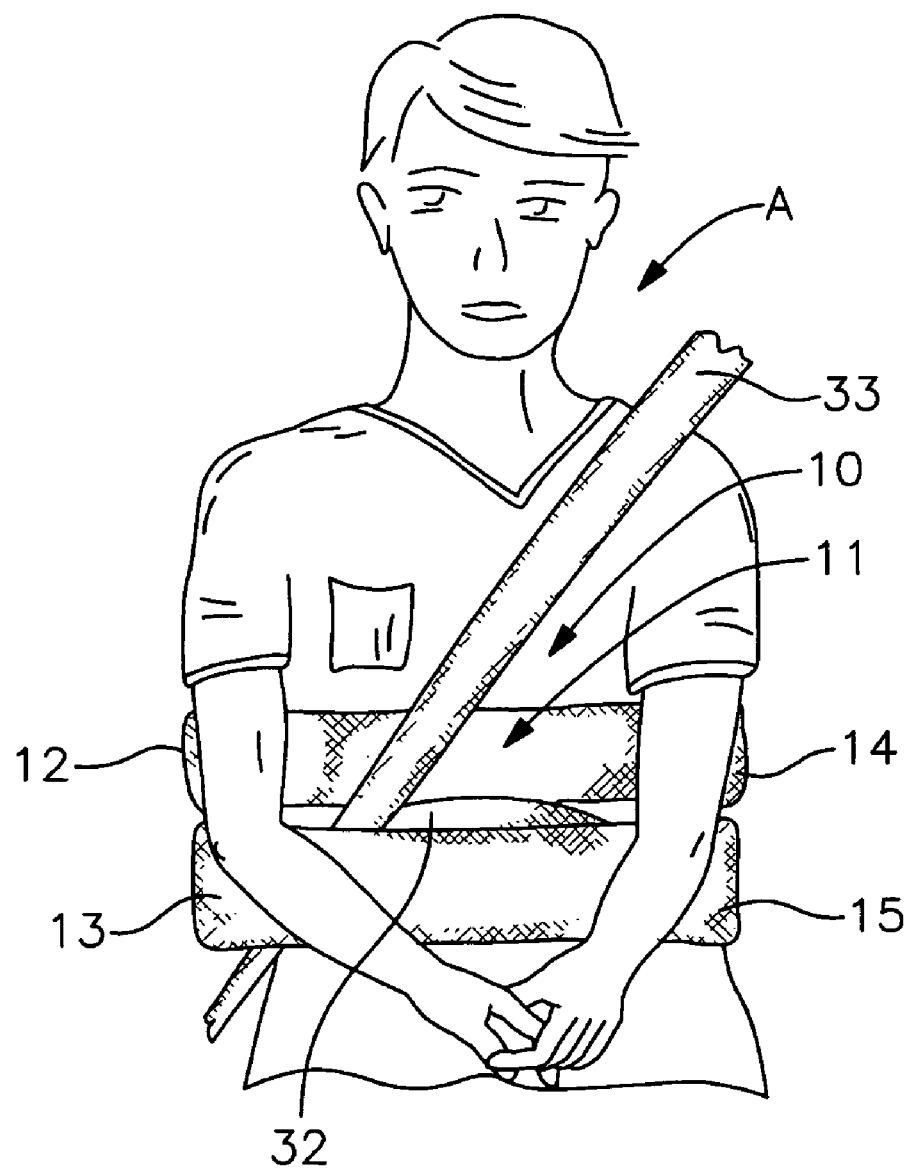
FIG. 6 is a front perspective view of an alternate use configuration for an adult.

Alternately, the cushion arm portion and body member of the invention could be formed from a pair of monolithic contoured molded blocks of synthetic foam material, but preferably a fabric covering as hereinbefore described would be used for durability and tactile comfort for the user due to the nature and positioning during use as will be discussed in greater detail hereinafter as best seen in FIGS. 1 and 6 of the drawings.

In typical application use for a child the assembled safety cushion 10 of the invention is placed onto the lap L of the child C in a car seat (not shown) or a vehicle seat 29 in a vehicle V generally illustrated in FIG. 1 of the drawings. A typical vehicle seat belt assembly 31 having a lap belt portion 32 and an interconnected shoulder belt portion 33 is retractably deployed from attachment to the vehicle (not shown) over the safety cushion 10 of the invention as follows.

The lap belt 32 extends through openings S defined between the respective arm extensions 12 and 13 and 14 and 15 and then over a central area 30 of the main body member portion 11 therebetween and interlocks with a receiving belt buckle (not shown) which typically extends from within in this example the vehicle's back seat 29.

Correspondingly, the shoulder belt portion 33 extends over and across the upper portion of the main body member 11 and extension arm 12 and down through the opening S between the respective arm extensions 12 and 13 joining with the lap belt 32 at its attachment engagement end fitting point as previously described interlocking a belt receiving buckle (not shown) on its respective joint end.

It will be seen that the upstanding extension cushion portion 23 will protect the child's C head and face 33A from the shoulder belt 32 by lateral engagement therewith. It will be evident that the size of the child C will change the portions of the safety cushion 10's engagement therewith. With the combination lap and shoulder seat belt 31 and 32 deployed, the safety cushion 10 of the invention is held firmly against the child C which protects against direct force impact which would be imparted by the seat belt assembly 31 during an accident and sudden deceleration of the occupants within the vehicle. The safety cushion 10 of the invention has been so designed that the child C will be comfortable and secure while still able to see around the upstanding extending cushion portion 23 from the main body member 11 by lateral displacement during application use of the extension cushion portion 23 against the shoulder belt 33 as best seen in FIG. 1 of the drawings and as indicated graphically in broken lines in FIG. 3 of the drawings.

An alternate use configuration for adults can be seen in FIG. 6 of the drawings wherein just the central elongated contoured body member portion 11 with the integral oppositely disposed arm extensions 12–15 is used. In such alternate use, the main body member 11 alone is placed on the lap of an adult A, the seat belt assembly is positioned across the safety cushion 10 as previously described isolating the user from direct contact with the belt by providing a cushioned intermediate material therebetween.

It is the unique combination of the so-configured safety cushion 10 of the invention which utilizes the integral oppositely disposed spaced pairs of arm extensions 12 and 13 and 14 and 15 for an adult and the upstanding cushion portion 23 for a child will allow for the traditional seat belt assembly to be effectively and easily engaged over the safety cushion 10 and placed against the occupant thus isolating them from direct contact with the seat belt assembly yet while maintaining the child or adult in a safe and secure position within either a car seat (not shown) or on the vehicle seat 29 as illustrated.

The ease and use of adaptability of the universal safety seat cushion 10 of the invention is evident from the above description and it will be apparent to those skilled in the art that various changes and modifications may be made therein without departing from the spirit of the invention.

Therefore I claim:

1. A safety device for vehicle occupants for use with a vehicle seat belt assembly to protect against seat belt related injuries comprising,
    a discreet contoured cushion for fitting against a user's upper body,
    said cushion having a central body member,
    pairs of support engagement arms extending therefrom,
    each of said arm extensions having a front surface, a back surface and intervening sidewall surfaces,
    said support engagement arm extension pairs in oppositely disposed spaced relation to one another,
    an upstanding extension cushion portion removably secured on said central body member is at right angles to said support engagement arm pairs,
    said upstanding extension cushion portion having a front surface, a back surface, a top with intervening interconnected sidewall surfaces associated therewith and a loop band extending therefrom.

2. A safety cushion device set forth in claim 1 wherein said pairs of support engagement arms and said upstanding extension cushion portion are of an equal longitudinal dimension.

3. The safety cushion device set forth in claim 1 wherein said pairs of support engagement arms are in respective planar alignment with each other defining elongated seat belt receiving openings therebetween.

4. The safety cushion device set forth in claim 1 wherein said cushion is filled with synthetic resin foam based material.

5. The safety cushion device set forth in claim 1 wherein said upstanding extension cushion portion defines integrated front and back surfaces with oppositely disposed contoured interconnecting sidewall panels, a respective top panel integral therewith and said loop extension defined by continuation of said front and back surfaces.

6. A safety child restraint cushion for children for use in a vehicle having a lap belt and a shoulder belt restraint assembly comprising,
    an elongated central body member,
    oppositely disposed aligned pairs of support engagement arms extending therefrom,
    an upstanding cushion arm loop extension in spaced relation to said support engagement arm extension pairs engageable on said central body member between said support engagement arm pairs,
    said support engagement arm pairs defining elongated openings therebetween through which a seat belt extends and over said central body member therebetween,
    a shoulder strap extending between one of said support arm's defined openings and selectively at the junction of said upstanding cushion arm extension and one of said remaining support engagement arm in trans-angular relationship therewith.

7. The safety child restraint cushion for children set forth in claim 6 is preferably formed of fabric material having a soft synthetic resin foam infill.

* * * * *